Nov. 3, 1953 K. T. BAINBRIDGE 2,658,147

TUNABLE VELOCITY MODULATION DEVICE

Filed Feb. 18, 1946 2 Sheets-Sheet 1

INVENTOR.
KENNETH T. BAINBRIDGE
BY
William D. Hall.
ATTORNEY

Nov. 3, 1953 K. T. BAINBRIDGE 2,658,147

TUNABLE VELOCITY MODULATION DEVICE

Filed Feb. 18, 1946 2 Sheets-Sheet 2

*INVENTOR.*
KENNETH T. BAINBRIDGE
*BY*
William D. Hall,
*ATTORNEY*

Patented Nov. 3, 1953

2,658,147

UNITED STATES PATENT OFFICE 2,658,147

TUNABLE VELOCITY MODULATION DEVICE

Kenneth T. Bainbridge, Cambridge, Mass., assignor, by mesne assignments, to the United States of America as represented by the Secretary of War Application February 18, 1946, Serial No. 648,522

10 Claims. (Cl. 250—36)

This invention relates to oscillator circuits and more particularly to velocity modulated oscillator circuits.

Velocity modulated oscillators are normally employed for generating signals having frequencies in the ultra-high frequency region (100 megacycles and higher). The oscillations are produced by causing a stream of electrons initially travelling at a uniform velocity to pass through an alternating field. This field, usually called the buncher field, alternately accelerates and retards the electrons passing through it. The electrons are then caused to travel at their new velocity through a space free of any variable field. The length of this drift space is so selected that the electrons are formed into bunches at the end of the space. Some means, usually a cavity resonator, is located at the end of the drift space to extract a portion of the energy from the electron stream. This cavity resonator (or other similar means) is tuned so that the bunches of electrons set up oscillations in the resonator. In order for oscillations to be maintained, it is necessary that the frequency at which the bunches of electrons arrive at this resonator shall be equal to the frequency to which this resonator is tuned or to some even submultiple of this frequency, and the bunches must arrive in the proper phase to sustain the oscillations in the resonator.

To maintain this required frequency and phase relationship, it is the usual practice to couple a portion of the energy from the above mentioned cavity resonator to a second cavity resonator through a line of variable length. This second cavity resonator supplies the buncher field mentioned above. This second cavity resonator must be tuned to the same frequency as the first cavity resonator or to some even submultiple of this frequency, and the line connecting the two resonators must be of such length that the oscillations in the two resonators bear the proper phase relationship to each other.

The conditions for oscillation mentioned above do not present many difficulties in a fixed frequency oscillator since the elements may be adjusted to the proper values when the oscillator is built. If a variable frequency oscillator is desired, however, this circuit presents many difficulties, the most important one being that a very precise (and therefore very expensive) tuning device must be provided to maintain the resonant frequency of the two cavity resonators exactly equal. A second though somewhat less important difficulty is to provide a correspondingly adjustable line between the two cavities to maintain the oscillations in the circuit.

It is an object of the present invention, therefore, to provide an oscillator operating on the two-cavity principle but employing only a single tuned cavity and hence only a single tuning element.

It is a further object of this invention to provide novel means for maintaining the proper relationships between the fields of the two resonators that form a part of the oscillator.

For a better understanding of the invention, together with other and further objects thereof, reference is had to the following description taken in connection with the accompanying drawing in which.

Figure 1:
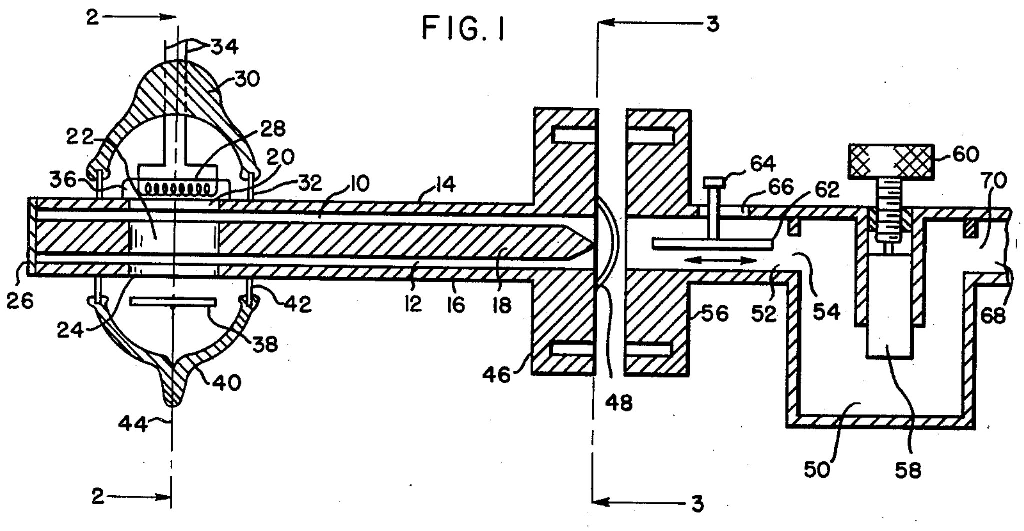
Fig. 1 is a sectional elevation of the preferred embodiment of the invention.

Reference is now had more particularly to Fig. 1 of the drawings in connection with a description of the preferred embodiment of the present invention. Two wave guides 10 and 12 are formed by two outer walls 14 and 16 and a relatively thick dividing wall 18. Aligned rectangular openings 20, 22, and 24 in walls 14, 16, and 18, respectively, form a passage through which electrons may travel, as will appear. Wave guides 10 and 12 are terminated at one end by a short circuiting plate 26 placed approximately a quarter wavelength from the center line of openings 20, 22, and 24. If it is inconvenient to have this distance one-quarter of a wavelength, it may be increased by any number of half wavelengths. Since the frequency of the oscillator here described is variable, the distance from the center line of the aligned openings to end plate 26 should be computed for the mid-frequency of the oscillator.

Figure 2:
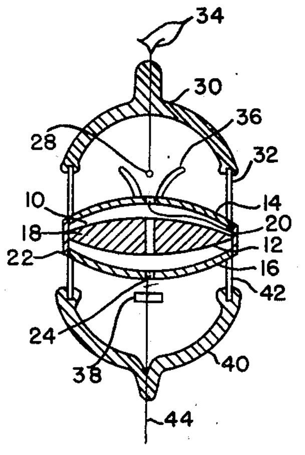
Fig. 2 is a second sectional view of the invention taken along the line 2—2 of Fig. 1.
Figure 3:
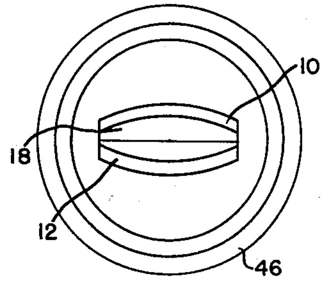
Fig. 3 is a third sectional view of the preferred embodiment of the invention taken along the line 3—3, Fig. 1.

In Figs. 2 and 3 of the drawings are shown cross-sectional views of the oscillator taken along lines 2—2 and 3—3 of Fig. 1. Parts in Figs. 2 and 3 have been given reference numerals corresponding to the reference numerals of like parts in Fig. 1. The cross-sectional dimensions of wave guides 10 and 12 are suitably chosen to propagate all frequencies that the oscillator may generate. The thickness of dividing wall 18 in the region of opening 22 is similarly suitably chosen to make the drift space formed by opening 22 of optimum length for all frequencies of the oscillator.

A filament 28 that serves as a source of electrons in this oscillator is placed with its axis parallel to the longer axis of opening 20, as shown in Figs. 1 and 2. This filament is external to outer wall 14 of wave guide 10, and in an evacuated space enclosed in part by a cap 30 and a glass or quartz seal 32. Leads 34 passing through cap 30 provide means for making electrical connections to filament 28. Auxiliary electrodes 36 may be included, if desired, to provide electrostatic focusing of the electrons in a beam toward opening 20. The shape of electrodes 36 together with their potential relative to the filament 28 and wave guide wall 14 is such that the electrons from filament 28 are focused in a flat beam as they pass into wave guide 10. If desired a magnetic field in which the magnetic lines are parallel to the average electron path from filament to anode may be employed to maintain the electrons in this flat beam as they pass through wave guides 10 and 12. A rectangularly-shaped anode 38, located adjacent to opening 24 and externally to wave guide 12, has its longer axis parallel to the longer axis of opening 24. Anode 38 is in the enclosure formed by a cap 40, a glass seal 42 and wall 16 of wave guide 12. A lead 44 passes through cap 40 to anode 38 to provide means for making electrical connection thereto.

Wave guides 10 and 12 are terminated at their other end by a choke joint 46 at a distance from short circuiting plate 26 that is equal to an odd number of quarter wavelengths at the mid-frequency of the oscillator. Dividing wall 18 is tapered in the vicinity of choke joint 46 to reduce its thickness to zero at the choke joint end of wave guides 10 and 12. A glass or quartz seal 48 is provided at choke joint 46 so that any desired pressure may be maintained within wave guides 10 and 12 and the enclosures containing filament 28 and the anode 38.

The oscillator includes a cavity resonator 50 which is coupled to a wave guide 52 by means of a window 54. Wave guide 52 is provided with a choke joint 56 adjacent to choke joint 46 of wave guides 10 and 12. The structures including choke joints 46 and 56 are so oriented that energy is coupled from wave guides 10 and 12 to wave guide 52 with very little loss. One of the choke joints, for example joint 46, may be designed for a frequency near the upper limit of the frequency of the oscillator, and the other choke joint, in this instance choke joint 56, is designed for a frequency near the lower limit of the frequency of the oscillator. The coupling between the wave guides 10, 12 and the wave guide 52 will then remain substantially constant over the operating frequency band of the oscillator. A wave guide 68 coupled to cavity resonator 50 by means of a window 70 provides means for obtaining an output signal from the oscillator.

A movable plunger 58, extending into cavity resonator 50 by an amount controlled by a screw 60, provides means for tuning cavity resonator 50 through a selected range of frequency. A partition member 62 divides wave guide 52 into two substantially equal parts, and is movable, by means of a post secured to the partition member, for the purpose of adjusting the coupling between wave guides 10 and 12. The partition member post extends through a slot 66 in a wall of wave guide 52 and ends in knob 64. Friction means may be provided to maintain the post and the partition member secured thereto in an adjusted position.

When the apparatus of Fig. 1 is to be operated as an oscillator, filament 28 is heated to a suitable temperature by electrical energy supplied to it through leads 34. Electrons emitted from the filament are accelerated toward anode 38 by connecting one of the leads 34 and lead 44 to the negative and positive terminals, respectively, of a source of electrical energy. Although no alternating field initially exists in either wave guide 10 or 12 nor within cavity resonator 50 the initiation of the electron stream when the oscillator is first placed in operation, or irregularities in the electron stream flowing from filament 28 to anode 38, will cause oscillations to be set up in wave guides 10 and 12 and cavity resonator 50. The frequency of these oscillations may be adjusted by means of the plunger 58 in cavity resonator 50, and the amplitude and phase relationship of the oscillations in wave guide 10 may be adjusted with respect to the oscillations in wave guide 12 by moving partition member 62 axially along wave guide 52. When the frequency of the oscillator has been adjusted to the desired value and the position of partition member 62 has been adjusted for optimum operation of the oscillator circuit, electrons leaving filament 28 and passing through opening 20 will be alternately accelerated and decelerated by the alternating field existing within wave guide 10. Thus, after travelling through the drift space 22 formed in dividing wall 18, electrons arrive at wave guide 12 in bunches at suitable instants to be decelerated by the field in this wave guide. This deceleration of the electron bunches causes some of the energy of movement of the electron bunches to be imparted to the alternating field within wave guide 12. This imparted energy is transferred by wave guide 12 to cavity resonator 50, and a portion of this energy is in turn supplied to wave guide 10 to sustain the oscillating field in this wave guide. Energy is supplied from cavity resonator 50 to an external source by means of the wave guide 68. It may be noted that as in any oscillator circuit of this nature, the energy in the oscillating field is derived from the direct-current potential source that accelerates the electrons from filament to anode.

Several advantages of the oscillator circuit here disclosed are that:

(1) Only one tuned cavity is employed; hence no complicated tuning device is required.

(2) Only two simple adjustments are required to adjust the frequency of this oscillator to any selected value within the range of values for which the oscillator circuit is designed.

(3) The cavity resonator of this oscillator is outside the evacuated space and it may therefore be separated and replaced at will.

Figure 4:
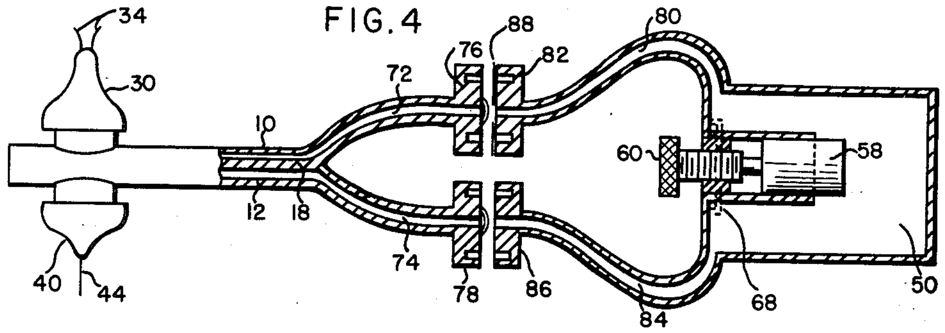
Figs. 4, 5, and 6 are partial sectional views showing three other embodiments of the present invention.
Figure 5:
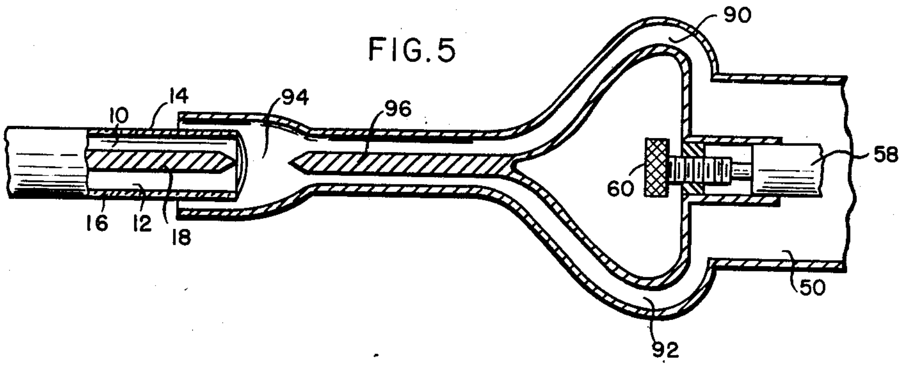
Figure 6:
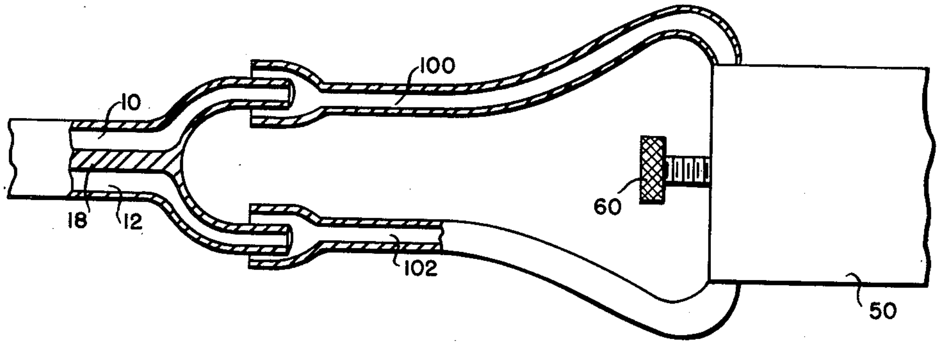

Figs. 4, 5, and 6 in which like reference numerals designate like parts, illustrate three modifications of the present invention. In the oscillator shown in Fig. 4, the dividing section 18 separating wave guides 10 and 12 is bifurcated, so that two more widely separated wave guides 72 and 74 are formed as continuations of wave guides 10 and 12, respectively. Wave guides 72 and 74 are terminated in choke joints 76 and 78, respectively. A wave guile 80 is connected to cavity resonator 50, and is coupled to wave guide 72 by means of a choke joint 82 adjacent to choke joint 76. In a similar manner a wave guide 84 which is also coupled to cavity resonator 50 is coupled to wave guide 74 by means of a choke joint 86 adjacent to choke joint 78. Seals at choke joints 76 and 78 permit any desired pressure to be maintained within wave guides 10 and 12. A variable iris 88 inserted between choke joints 76 and 82 provides means for adjusting the electric field within wave guide 10. The function of iris 88 in the structure shown in Fig. 4 is the same as that of partition member 62 in the structure shown in Fig. 1, namely, to obtain the proper relationships between the electric fields in wave guides 10 and 12. An output guide 68 provides means for extracting a signal from resonator 50.

The oscillator shown in Fig. 5 differs from that shown in Fig. 1 in that choke joint 46 and certain other components are replaced by substantially equivalent structure. The ends of wave guides 10 and 12 are sealed by a suitable glass or quartz seal. Two wave guides 90 and 92 are coupled to resonator 50 and these two wave guides are then formed into a single wave guide 94 by tapering the dividing section 96 that separates wave guides 90 and 92. The tapered end of dividing section 96 may be spaced from the tapered end of dividing section 18 as shown. The physical size of wave guide 94 is sufficient to extend over the ends of wave guides 10 and 12 without making physical contact with walls 14 or 16. Wave guide 94 should extend approximately a quarter of a wavelength over the corresponding end of wave guides 10 and 12, so that an electrical short circuit will exist between the end of walls 14 and 16 and the walls of wave guide 94. The operation of the circuit shown in Fig. 5 differs from the operation of the circuit of Fig. 1 primarily in that in Fig. 5 it is the axial position of wave guide 94 which is varied with respect to wave guides 10 and 12 so that the desired relationships are obtained within wave guides 10 and 12, rather than adjusting a dividing section 62 as in the structure shown in Fig. 1.

The embodiment of the invention shown in Fig. 6 is somewhat similar to that shown in Fig. 4. Wave guides 10 and 12 are forked apart at their ends, and two other wave guides 100 and 102 which at their ends are physically enlarged extend over the ends of wave guides 10 and 12. Energy from wave guides 10 and 12 are connected to cavity resonator 50 through entirely separate paths. The distance that wave guides 100 and 102 extend over the ends of wave guides 10 and 12, respectively, is adjustable to provide adjustment of the fields within wave guides 10 and 12.

While there have been described what are at present considered the preferred embodiments of the invention, it should be obvious to those skilled in the art that various changes and modifications may be made therein without departing from the invention.

What is claimed is:

1. A variable high frequency oscillator comprising a cavity resonator, a source of electrons, means adjacent said electron source for accelerating and collecting said electrons, first and second wave guides having aligned openings therein and a drift space therebetween and mounted with said openings and said drift space defining a path from said source of electrons to said collecting means, said aligned openings and said drift space being disposed between said source of electrons and said collecting means within the electron stream so that electrons arriving at said second wave guide transfer energy to the alternating field in said second wave guide, means adjustably coupling said first and second wave guides to said cavity resonator, means coupled to said cavity resonator for adjusting the resonant frequency of said cavity resonator whereby the frequency of signals generated by said oscillator may be varied over a predetermined range, means coupled to said cavity resonator for obtaining an output signal from said oscillator, and means inclosing said source of electrons, said drift space, said collecting means, and at least a portion of said first and second wave guides so that any desired pressure may be maintained within the inclosed space.

2. A variable high frequency cavity oscillator comprising a cavity resonator, a first and a second wave guide, means coupling said wave guides together and to said cavity resonator, said first and said second wave guides having aligned openings in the walls thereof providing a path for a stream of charged particles to pass through alternating fields established in said first and second wave guides, means connecting said first and second wave guides and providing a drift space relatively free of alternating fields, means mounted adjacent said openings for causing a stream of electrons to pass through said aligned openings and the drift space therebetween, adjustable means communicating with said coupling means for varying the coupling between said wave guides whereby said stream of electrons sustains the oscillations in said second wave guide, and means coupled to said cavity resonator for adjusting the frequency of said cavity resonator whereby the signal generated by said oscillator may be varied over a predetermined range of frequencies.

3. A variable high frequency oscillator of the velocity modulation type comprising an electron beam source and an electron collector electrode defining an electron beam path therebetween, first and second wave guides mounted adjacent one another and extending across said beam path and provided with apertures for passage of said electron beam, means about said beam path between said wave guides for providing a drift space for said electrons in said beam, a cavity resonator, adjustable coupling means coupling one end of each of said wave guides to said resonator, means short-circuiting the other end of each of said wave guides at an odd number of quarter wavelengths from said apertures at the mean operating frequency, and means coupled to said resonator for varying the resonant frequency thereof, whereby said electron beam generates a signal whose frequency may be varied over a predetermined range of frequencies.

4. A variable high frequency oscillator according to claim 3 wherein said adjustable coupling means comprises means adjustably coupling said wave guides together.

5. A high frequency oscillator of the velocity modulation type comprising an electron beam source and an electron collector electrode defining an electron beam path therebetween, first and second wave guides mounted adjacent one another and extending across said beam path and provided with apertures for passage of said electron beam, means about said beam path between said wave guides for providing a drift space for said electrons in said beam, a cavity resonator, adjustable coupling means coupling one end of each of said wave guides to said resonator, said adjustable coupling means comprising a third wave guide coupled between both said first and second wave guides and said resonator, an adjustable partition member mounted in said third wave guide, means short-circuiting the other end of each of said first and second wave guides at an odd number of quarter wavelengths from said apertures at the mean operating frequency, and means coupled to said resonator for varying the resonant frequency thereof, whereby said electron beam generates a signal whose frequency may be varied over a predetermined range of frequencies.

6. A variable high frequency oscillator according to claim 3 wherein said adjustable coupling means comprises a pair of wave guides adjustable in length and respectively coupled between said first and second wave guides and said resonator.

7. A variable high frequency oscillator of the velocity modulation type comprising an electron beam source and an electron collector electrode defining an electron beam path therebetween, first and second wave guides mounted adjacent one another and extending across said beam path and provided with apertures for passage of said beam therethrough, one of said wave guides defining a space for velocity modulation of the electrons in said beam with high frequency electromagnetic energy, means about said beam path between said wave guides for providing a drift space for the bunching of said velocity modulated electrons, the other of said wave guides defining a space for obtaining ultra high frequency electromagnetic energy from the bunched electron beam, a cavity resonator coupled to both of said wave guides, an adjustable means coupling one end of each of said wave guides to said resonator, and an adjustable tuning device coupled to said resonator whereby the frequency of resonance of said cavity resonator determines the frequency of said electromagnetic energy.

8. A variable high frequency oscillator according to claim 7, wherein said adjustable means comprises a pair of separated wave guides respectively coupled between said first and second wave guides and said resonator.

9. A variable high frequency oscillator according to claim 8, wherein one of said separated wave guides includes an adjustable iris for varying the amount of energy coupled therethrough.

10. A variable high frequency oscillator comprising an electron source, means adjacent said electron source for accelerating and collecting electrons therefrom, a wave guide, a wall disposed within and dividing said wave guide into two substantially parallel sections, said wave guide and said wall having aligned openings therein, said aligned openings being disposed between said electron source and said collecting means and defining a path for said electrons, said opening in said wall forming a drift space for said electrons, means short-circuiting one end of said wave guide at an odd number of quarter wavelengths from said aligned openings at the mean operating frequency, a variable frequency cavity resonator, coupling means coupled to the other end of said wave guide at an odd number of quarter wavelengths from said short circuiting means at the mean operating frequency and coupling said wave guide to said cavity resonator, means coupled to said coupling means for varying the coupling between said sections, adjusting means coupled to said cavity resonator for adjusting the resonant frequency thereof to vary the frequency of the signals generated by said oscillator over a wide range, means coupled to said resonator for obtaining an output signal from said oscillator, and airtight means enclosing said electron source, said collecting means, and at least that portion of said wave guide including said aligned openings, so that a vacuum may be maintained therewithin.

KENNETH T. BAINBRIDGE.

References Cited in the file of this patent

UNITED STATES PATENTS

| Number | Name | Date |
|---|---|---|
| Re. 22,724 | Varian et al. | Feb. 19, 1946 |
| 2,240,183 | Hahn | Apr. 29, 1941 |
| 2,367,295 | Llewellyn | Jan. 16, 1945 |
| 2,400,753 | Haeff | May 21, 1946 |
| 2,445,811 | Varian | July 27, 1948 |

FOREIGN PATENTS

| Number | Country | Date |
|---|---|---|
| 541,631 | Great Britain | Dec. 4, 1941 |